United States Patent [19]

Steger

[11] 3,884,086

[45] May 20, 1975

[54] AUDIO DOSIMETER

[75] Inventor: James O. Steger, Muncie, Ind.

[73] Assignee: Ball Corporation, Muncie, Ind.

[22] Filed: July 27, 1973

[21] Appl. No.: 383,292

[52] U.S. Cl. .................. 73/558; 179/1 N; 340/261; 73/557
[51] Int. Cl. ............................................. G01h 5/00
[58] Field of Search ....... 179/1 N; 340/261; 73/558, 73/556, 557, 555

[56] References Cited
UNITED STATES PATENTS

| | | | |
|---|---|---|---|
| 2,590,460 | 3/1952 | Rackey et al. | 73/557 |
| 2,884,085 | 4/1959 | Von Wittern et al. | 73/557 |
| 3,089,561 | 5/1963 | Michael et al. | 73/558 |
| 3,144,089 | 8/1964 | Lane et al. | 73/557 |
| 3,236,327 | 2/1966 | Church | 73/558 |
| 3,280,937 | 10/1966 | Faber | 73/559 |
| 3,594,506 | 7/1971 | Bauer | 181/.5 D |
| 3,696,206 | 11/1970 | Ida | 181/.5 D |
| 3,697,973 | 3/1970 | Stevens | 340/261 |
| 3,747,703 | 7/1973 | Knowd et al. | 340/261 |
| 3,778,552 | 12/1973 | Edinborgh | 179/1 N |

Primary Examiner—Maynard R. Wilbur
Assistant Examiner—H. A. Birmiel
Attorney, Agent, or Firm—James D. Haynes

[57] ABSTRACT

An audio dosimeter for determining the exposure to noise as a function of both time and noise level. Input sound energy is appropriately weighted so as to account for the effect thereof on the human ear. The weighted sound signal is then utilized to gate pulses of selected discrete frequency levels to a counter, such that as the sound level increases, correspondingly higher frequency pulses are coupled to the counter. The counter stores the count therein until read out by an appropriate display device.

3 Claims, 5 Drawing Figures

AUDIO DOSIMETER

BACKGROUND OF THE INVENTION

The physiological effects of sound energy have been appreciated for some time. However, it was not until the passage of the Walsh-Healey Act that quantitative limits have been set on the permissible exposure of the human ear to sound or noise. Accordingly, there have been substantial efforts to provide an instrument which would help industry to determine their degree of conformance to the quantitative noise requirements of the Walsh-Healey Act.

As sound waves travel they radiate outward from their source. As the waves cover an increasingly large area, the strength thereof diminishes. A good rule of thumb is that the amplitude of waves are reduced by one-half when the distance is doubled, assuming of course that the sound is radiating from a relatively small source compared to the distance from the source. In addition, the human ear hears without damage pressure levels that are approximately 100,000 times stronger than the lowest pressure level that it can detect. Because the ear is sensitive to differentials in sound intensity, a sound reference unit was developed termed the decibel (dB). A decibel is mathematically defined as:

$$dB = 20 \log_{10}(A_2/A_1) \quad (1)$$

where $A_1$ is the lowest pressure level that the human ear can detect and $A_2$ is the pressure level measured. Thus, one dB corresponds to a pressure level ratio of 1.12:1, 6 dB corresponds to a pressure level ratio of 2:1 and 40 dB corresponds to a pressure level ratio of 100:1. A sound intensity of 130 dB is usually considered the threshold of pain.

It is well-known that sound intensity and loudness differ because the human ear is more sensitive to certain frequencies of sound than to others. Thus, a tone at 5,000 Hz will be much louder than a tone of 100 Hz even though both are transmitted with the same sound pressure. A system for measuring loudness, that is, sound intensity as measured by the human ear, was developed by weighting the intensity of sound in accordance with the frequency thereof. Thus, a commonly designated "A" weighted filter has been developed which accomplishes this by providing a frequency response which approximates the inverse of the human ear response.

Noise limits as established by the U. S. Department of Labor under the Walsh-Healey Act use the "A" weighted decibel (dBA) scale to define the noise limits for industrial environments. These limits are derived from statistical studies of hearing losses and are set forth as follows:

TABLE 1

| Duration of Daily Exposure | Allowable Level |
|---|---|
| Hours | dB (A) |
| 8 | 90 |
| 6 | 92 |
| 4 | 95 |
| 3 | 97 |
| 2 | 100 |
| 1½ | 102 |
| 1 | 105 |

TABLE 1-Continued

| Duration of Daily Exposure | Allowable Level |
|---|---|
| ½ | 110 |
| ¼ | 115 |

A graphical relationship of the permissible human exposure time in hours per day vs. sound level in dB(A) as set out in Table 1 is shown graphically in FIG. 1 wherein the exposure time is represented by the ordinate and the sound pressure level as measured by the human ear is represented by the abscissa. From FIG. 1, a person could be exposed to a maximum of 8 hours of noise at a 90 dB(A) pressure level. However, if the noise level increases to 95 decibels, it can be seen that a person can be exposed thereto for only 4 hours before the limits of the Walsh-Healey Act are exceeded. When the noise level rises to 115 dB(A), the total time exposure is only one-fourth of an hour.

Under actual working conditions, however, a person may be exposed to varying levels of sound pressure. Thus, for example, in one 8 hour day a person may be exposed to 2 hours of noise at 90 dB(A), 1 hour of 95 dB(A) noise and one-half hour of 100 dB(A) noise with the remaining noise exposure time being below 90 dB(A). In this noise environment, the exposure to 2 hours of 90 dB(A) noise accounts for 25% of the maximum allowable noise exposure for the day. The one hour of 95 dB(A) exposure accounts for 25% of the maximum allowable noise exposure and the one-half hour of 100 dB(A) noise exposure accounts for 25% of the maximum allowable noise exposure. Accordingly, during the aforementioned 8 hour exposure period, the person was exposed to 75% of the maximum allowable noise exposure.

In order to determine the exposure of an individual to noise, a portable audio dosimeter worn by the individual during the entire exposure period must be provided. There have been a number of such dosimeters provided in the past. For example, in U.S. Pat. No. 3,144,089, issued to Lane, et al., there is shown a noise exposure meter wherein noise is detected by a microphone and converted to an electrical signal. The signal is rectified and then coupled to an electro-chemical integrator, such as, a coulometer. The coulometer integrates the current passing therethrough so that the position of the gap of the coulometer is representative of the total noise exposure of the person wearing the meter. This dosimeter, however, does not take into account the sensitivity of the ear to various frequencies of the sound spectrum and includes no means for determining whether the accumulated noise over a period of time is in compliance with the Walsh-Healey Act.

U.S. Pat. No. 2,884,085 to Wolf-Wito von Wittern et al illustrates another example of past efforts to provide noise exposure meters. This patent discloses a microphone for detecting sound pressure levels and for converting the pressure levels to a corresponding electrical signal. An intensity discriminator is provided which consists of a plurality of vacuum tubes, each of which is gated at successively higher discrete voltage signal levels. As each vaccum tube is gated on, a relay is actuated to initiate operation of a clock. Accordingly, at a first noise level the first vacuum tube is gated and the clock associated therewith starts to operate. As the noise intensity increases, the second vacuum tube is gated to thereby initiate operation of a second clock associated therewith and so on until the noise intensity reaches such a level that each of the vacuum tubes are gated and each of the clocks are operating. After a predetermined period of time, the noise exposure at each sound level can be determined by reading the clocks. However, there is no means for taking into account the ear's sensitivity to different frequencies of sound and in addition a plurality of relay operated clocks are required which operate at relatively high levels of power. Thus this noise exposure meter could not be readily carried about by a person on the job for extended periods of time.

U.S. Pat. No. 3,696,202 issued to Ida, et al., discloses an audio dosimeter which detects sound pressure levels and converts these levels to a weighted signal representing the loudness of the sound as detected by the human ear. This signal is then amplified and coupled to an electrochemical device, such as a coulometer, for detection of the accumulated noise intensity level over a period of time. This patent, however, does not disclose a well-defined means for preventing noise levels lower than 90 dB(A) from being accumulated and stored by the coulometer. Accordingly, the coulometer will provide an output which indicates that the accumulated noise level is higher than it actually is. In addition, accurate response to peak noise levels is not provided since peak storage capacitors store the peak noise levels thereby distorting the time variance of the noise pressure signal. Accordingly, the coulometer provides a read-out which once again is higher than the actual accumulated noise level.

From the foregoing it can be seen that there is a substantial need for an accurate, portable audio dosimeter for detecting accumulated noise with respect to time so that compliance with the Walsh-Healey Act can be ascertained.

SHORT STATEMENT OF THE INVENTION

Accordingly, applicant's invention is related to a portable audio dosimeter for individual use which includes a means for sensing and converting sound to an electrical signal representing the sound. The signal is filtered by an A weighted filter which has a frequency response that approximates the inverse of the frequency response of the human ear. The output of the A weighted filter is converted to a DC signal. Pulses from a clock pulse generator are divided by a divider circuit wherein the divider provides a plurality of outputs each supplying a discrete clock pulse frequency. Outputs of the divider are each coupled to an associated gate. The gates are enabled by the DC voltage from the weighted filter such that the gate associated with the lowest frequency output of the divider is enable when the DC voltage reaches a level representing 90 dB(A) noise level. The next gate which is associated with the next highest frequency output of the divider is enabled when the DC voltage reaches a level corresponding to 95 dB(A) level and so on. The outputs of the gates are coupled to a counter which serves as an integrator. The output of the integrator is an indication of the accumulated noise level detected by the audio dosimeter of this invention. Should the limits of the Walsh-Healey Act be exceeded, that is, the counter exceed a predetermined count level, an overload circuit is energized which indicates that the accumulated noise limit has been exceeded.

BRIEF DESCRIPTION OF THE DRAWINGS

Other objects, features and advantages of this invention will become more fully apparent from the following detailed description, appended claims and the accompanying drawings, in which:

DETAILED DESCRIPTION OF THE PREFERRED EMBODIMENT

Figure 1:
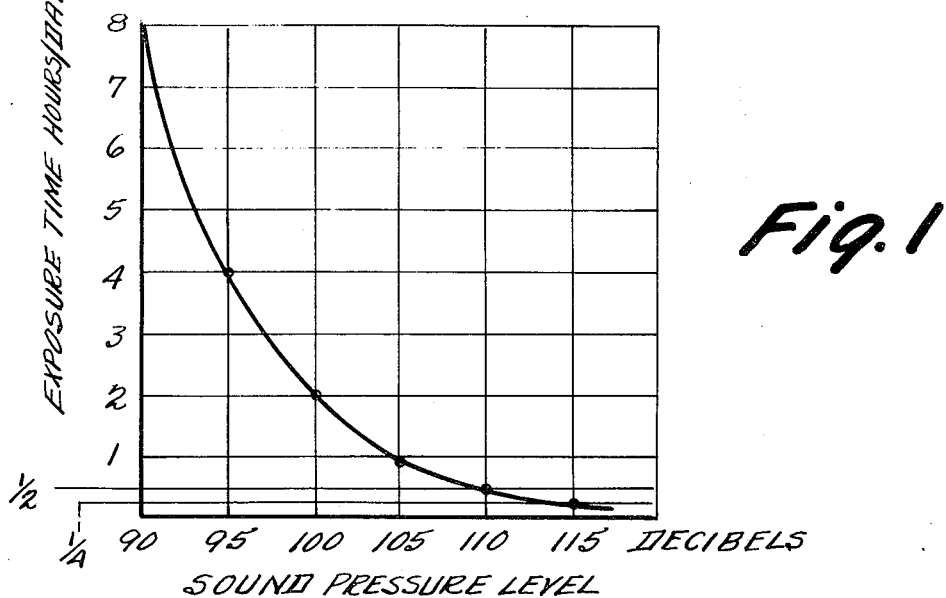
FIG. 1 is a graphical display of the Walsh-Healey Act requirement of permissible human exposure time in hours per day v. sound pressure level in dB(A)
Figure 2:
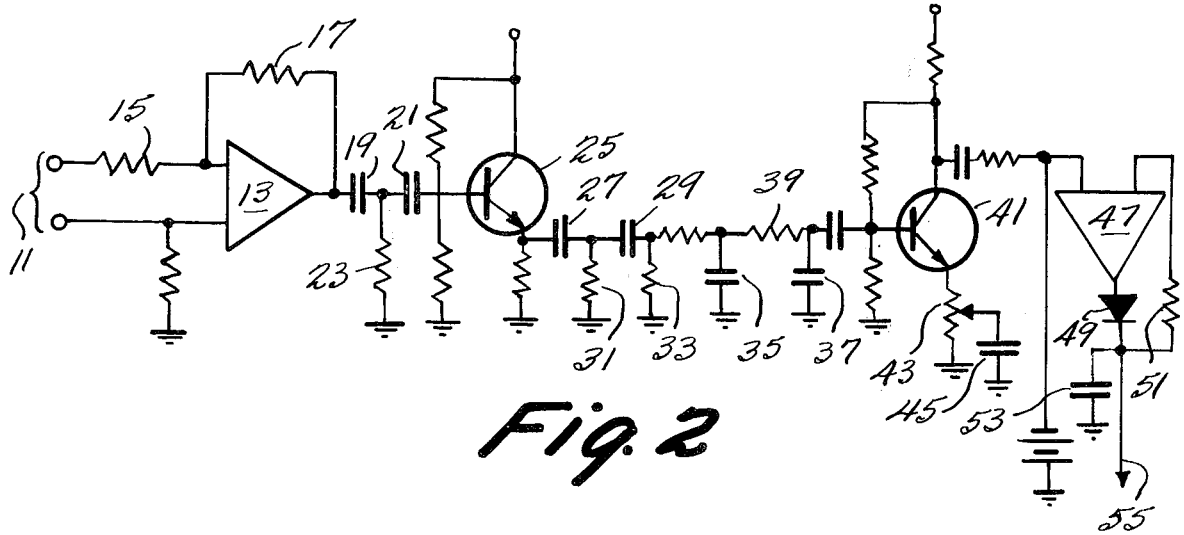
FIG. 2 is a schematic circuit diagram of the A weighing filter and input circuit of the audio dosimeter of this invention.

Refer now to FIG. 2, which is a schematic diagram of the input circuit and A filter of the dosimeter of the present invention. A sound pressure transducer (not shown) is connected to the input terminals 11 of the audio dosimeter. The transducer may be of any conventional type such as, for example, a microphone. The output of the transducer is connected to a preamplifier 13 through an input resistor 15. Amplifier 13 is a typical integrated circuit operational amplifier of conventional design. Feedback resistor 17 establishes the amplification or gain of the amplifier 13. The output of the amplifier is coupled to a high pass filter which includes capacitors 19 and 21 and resistor 23. This filter is part of a weighting filter which has a transfer characteristic which is the inverse of the response of the human ear. Capacitors 19 and 21 and resistor 23 attenuate the low frequency components of the noise frequency spectrum. Transistor 25 is connected as an emitter follower and couples the high pass filter to a low pass filter formed by capacitors 27 and 29 and resistors 31 and 33. Capacitors 35 and 37 and resistor 39 provide additional tailoring of the transfer characteristics of the A filter so that the filter provides a transfer function which is essentially the inverse of the response of the human ear.

The output of the A weighted filter is connected to the base terminal of transistor 41 which amplifies the output of the A weighting network. Potentiometer 43 is connected to the emitter terminal of transistor 41 with the other terminals thereof connected to ground. The midpoint of the potentiometer is connected via a bypass capacitor 45 to ground. Accordingly, by varying the setting of the potentiometer, the amplification of the output of the A weighting filter is adjusted. Thus, the potentiometer 43 can be utilized to calibrate the audio dosimeter.

The output of transistor 41 is coupled to an active rectifying circuit comprising an operational amplifier 47 and a diode 49. Feedback resistor 51 is provided in combination with operational amplifier 47 to linearize the rectifying characteristics of the diode 49 in a known manner. Capacitor 53 is provided for filtering out the AC component of the rectified signal.

Figure 4:
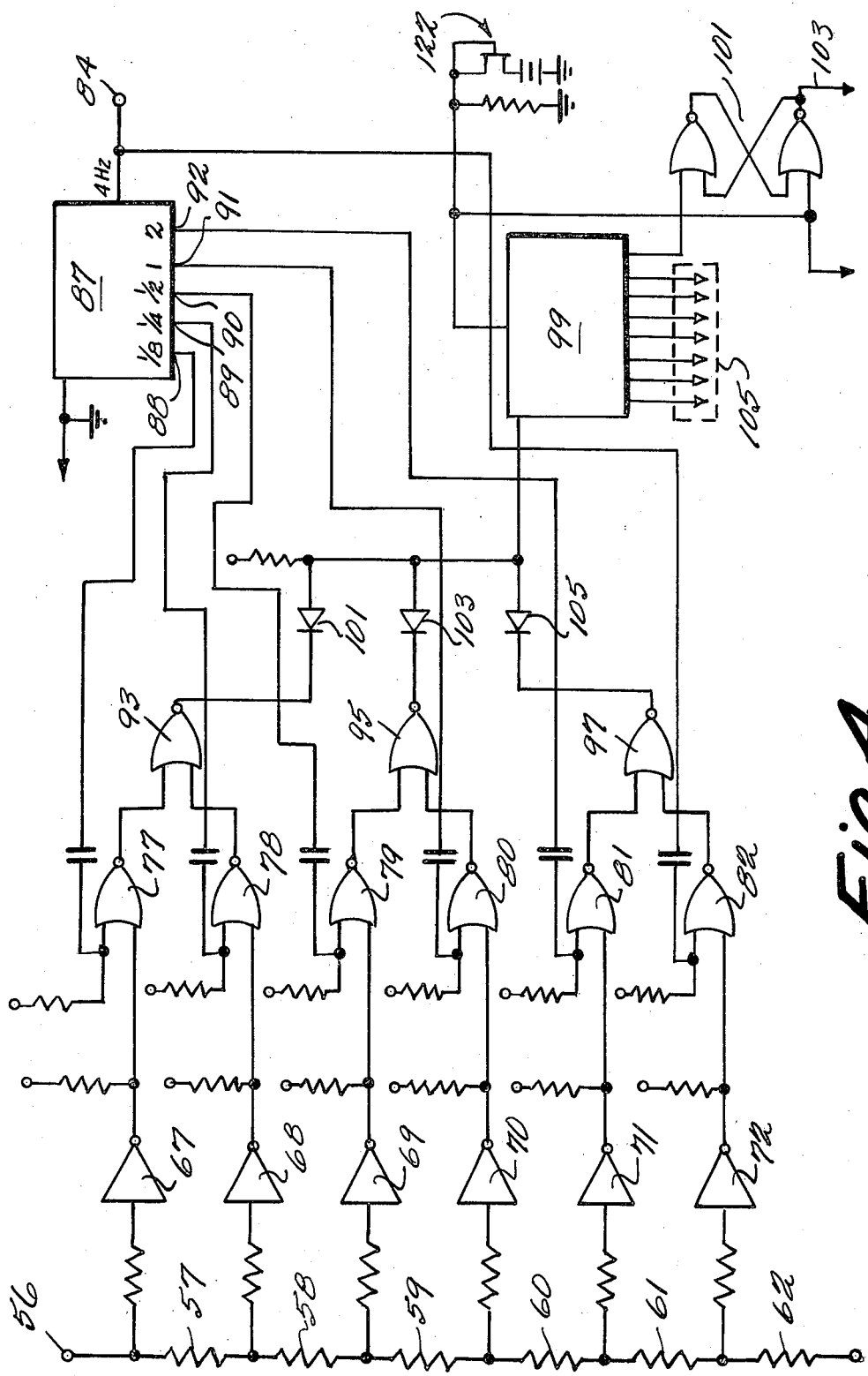
FIG. 4 is a schematic diagram illustrating the manner in which the noise pressure level is accumulated with respect to time.

Refer now to FIG. 4 where there is shown the circuit for integrating the noise level with respect to time. The DC output at terminal 55 of the rectifier is connected to terminal 56 of a voltage divider circuit which includes resistors 57–62. The voltage divider divides the voltage level from the output of the active rectifier in 5dB steps. A series of digital comparators 67–72 are connected to the taps of the attenuator with the outputs of the comparators each being connected to one terminal of an associated gate 77–82. The other input terminals of the gates 77–81 are connected to terminals 88–92, respectively, of divides 87. The second input terminal of gate 82 is connected to the input terminal 84 of divider 87.

Figure 3:
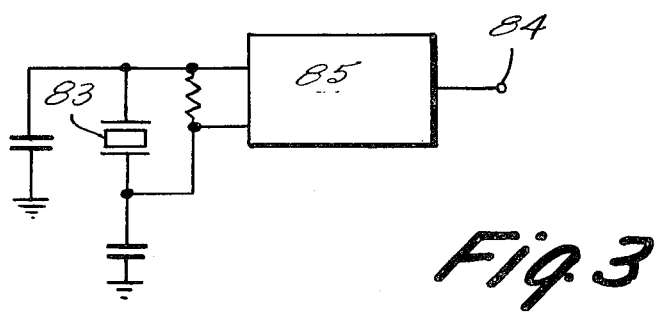
FIG. 3 is a schematic diagram of the clock pulse generator of this invention.

Refer now briefly to FIG. 3 where there is shown a clock pulse generator. A quartz crystal 83 is provided having a stable frequency of 32.768 KHz. The quartz crystal is connected in circuit in a conventional manner to form a quartz crystal oscillator. Since such oscillators are well known in the art, a detailed discussion of the operation thereof will not be presented herein. The output of a quartz crystal oscillator is coupled to a divider 85 which has 13 binary divider stages. Accordingly the output of the divider is a clock pulse signal having a frequency of 4Hz. This output is coupled to the divider 87 illustrated in FIG. 4. Divider 87 includes at least 5 stages of binary dividers so that the output at terminal 92 is 2Hz, the output at terminal 91 is 1Hz, at terminal 90 is ½ Hz, the output at terminal 89 is ¼ Hz, and at terminal 87 ⅛ Hz. As aforementioned these signals are coupled to gates 77–81, respectively. In addition the output of divider 85 is connected directly to gate 82 without passing through the divider 87. Accordingly, this input to gate 82 is at a frequency of 4Hz.

The outputs of gates 77 and 78 are coupled to gate 93, the outputs of gates 79 and 80 are coupled to gate 95 and the outputs of gates 81 and 82 are coupled to gate 97. The outputs of gates 93, 95 and 97 are each coupled to a counter 99 via diodes 101, 103 and 105, respectively. Counter 99 serves as an integrator and stores the cumulative noise exposure in binary form until data can be read out.

As will be seen hereinbelow, since the time units of the Walsh-Healey Act are in descending powers of 2, that is, 8, 4, 2, 1, ½, ¼, the different time rates needed to increment the integrator counter 99 can be derived from the precision clock source via the binary divider 87. Assume, for example, that a sound pressure level of 101 dB(A) drives the microphone at the input of the audio dosimeter. Since comparator 67 generates a low output when the input signal thereto reaches a level corresponding to 90 dB(A), gate 77 is enabled and thereby conductes a ⅛ Hz signal therethrough to gate 93. Gate 93 in turn couples the pulse train through isolating diode 101 to the integrator counter 99 where the ⅛ Hz pulses are counted as long as the signal persists. Since comparator 68 generates a low output signal when the input thereto represents a 95 dB(A) noise level, gate 78 is enabled. Hence ¼ Hz pulses from terminal 89 of counter 87 are conducted through gate 78, gate 93 and isolation diode 101 to the integration counter 99. Since the signal gated through gate 78 is twice the frequency of the signal to gate 77, the counter 99 counts only the ¼ Hz signal passing through gate 78. Further, since comparator 69 generates a gate enabling signal when the input thereto represents a noise pressure level of 100 dB(A), gate 79 is also enabled. Hence ½ Hz signals from terminal 90 of counter 87 are conducted through gates 79 and 95, through isolation diode 103 to the integration counter 99. Since these pulses are twice the frequency of the pulses passing through gate 78 and four times the frequency of pulses passing through gate 77, only the pulses passing through gate 79 will be counted by the counter 99. The remaining comparators 70–72 will not generate gate enabling signals since the input voltage thereto represents a noise level of less than 105 dB(A).

The integrator counter 99 requires 3,600 clock pulses for a 100% or full scale reading. Thus if the 101 dB(A) noise level is maintained thereby allowing one clock pulse every 2 seconds to enter the integrator, it will take 7,200 seconds for the counter to reach a full scale reading. This is equal to 2 hours which is exactly the designated maximum exposure time for a signal of 100 dB(A) per 8 hour unit of time.

If, for example, the dosimeter measured a noise level of over 115 dB(A), then each of the comparators 67–72 would generate gate enabling pulses for enabling gates 77–82. With each of the gates 77–82 enabled, the highest frequency clock pulses to enter integrator 99 would be 4Hz. Thus the integrator counter would count to its maximum count of 3,600 pulses in 15 minutes which is the maximum permissible exposure time under the Walsh-Healey Act. When the counter exceeds a count of 3,600 pulses, flip-flop circuit 101 is triggered to provide an overload output signal at terminal 103.

Figure 5:
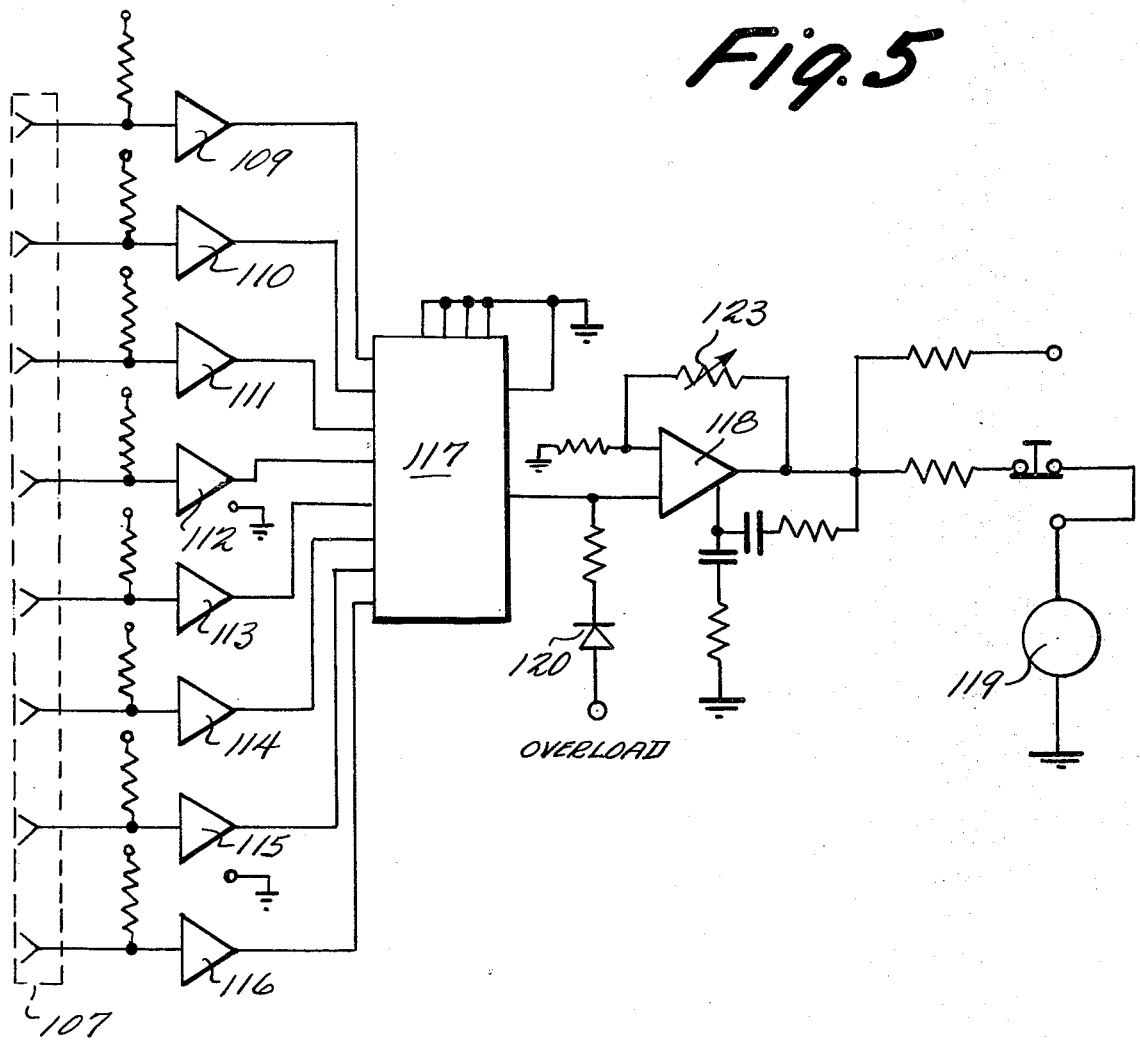
FIG. 5 is a schematic diagram of the display circuit for the dosimeter of this invention.

Refer now to FIG. 5, which is a schematic diagram of the readout circuit of the dosimeter of this invention. The output terminals of the integrator counter 99 which may be in the form of a female socket 105 are connected to the input circuit 107 of the readout circuit. The input terminal 107 may be in the form of a male connector plug which mates with the female connector plug at the output of integrator counter 99. The outputs of the integrator counter are amplified via amplifiers 109–116 are coupled to a digital-to-analogue converter circuit 117, which is of conventional design, and accordingly will not be described herein in detail. The output of the digital-to-analogue circuit 117 is coupled to an amplifier 118 where the signal level is amplified for driving a meter 119. Thus depending on the level of count in counter 99, the output of the digital-to-analogue converter 117 will vary and accordingly, the level of current flow through meter 119 will vary therewith to give an indication of the accumulated noise over a predetermined period of time.

If the noise limit set by the Walsh-Healey Act is exceeded, the overload flip-flop 101 will be triggered so that a high level output will appear at output terminal 103 thereof. This signal is coupled to amplifier 118 via isolation diode 120. Since this output is at a high level, the meter 119 is driven to full scale to indicate that the noise level has been exceeded. After the integrator counter 99 has been readout, flip-flop 103 and counter 99 can be reset by closing reset switch 122 shown in FIG. 4.

The system can be calibrated by appropriately adjusting the amplification factor of amplifier 118 by varying feedback resistor 123. Hence the meter 119 can be made to read full scale for a count of 3,600 pulses in integrator counter 99.

It should be understood that for a finer division of the discrete decibel levels, additional comparators and gating circuits could be employed. Thus decibel increments of 1 dB(A) could easily be accommodated by the present invention. In addition instead of employing a readout circuit such as disclosed in FIG. 5 a direct readout could be provided directly from the counter circuit 99.

By using a quartz crystal oscillator in combination with a divider chain, extremely accurate clock pulses can be generated for driving the counter integrator 99. In addition, by employing a digital binary counter 99 for long term integration, several problems with prior art techniques are overcome. Thus, for example, problems of drift with respect to time are eliminated since the counter can store its count indefinitely. In addition, the accuracy of the counter depends only on the integration clock rates and the number of stages of the integrator. Accordingly, it can be seen that the counter provides an extremely accurate output. In addition, once the output of the counter has been detected, the counter can be reset almost instantaneously by pushing reset switch 122.

By using digital logic circuits utilizing COS/MOS circuitry, the dosimeter of this invention utilizes extremely low power levels, such as, for example, between 400 and 900 micro-amperes, depending on the noise level detected by the audio dosimeter. Accordingly typical battery life is approximately 400 hours.

While the present invention has been disclosed in connection with a preferred embodiment it should be understood that other alternative embodiments may be utilized within the spirit and scope of the invention as defined by the appended claims.

What is claimed is:

1. An audio dosimeter means for sensing and converting sound to an electrical signal representing said sound, weighted filter means for filtering said signal, said filter having a frequency response which approximates the human ear frequency response, means for generating a DC voltage having a magnitude that is proportional to the filtered output of said weighted filter, voltage divider means including a plurality of output terminals for dividing said DC voltage, a plurality of comparator means each being connected to one of said output terminals of said voltage divider, each succeeding comparator generating an output when said DC voltage raises by a predetermined magnitude, a source of clock pulses, a divider means having multiple outputs for providing sequentially decreasing discrete frequency outputs, a plurality of gating means one each connected to an output of said divider, each being enabled by the output of an associated comparator to gate said pulses from said divider to said counter, and means for reading out the count of said counter.

2. The audio dosimeter of claim 1 further comprising: means for indicating when said counter has reached a predetermined level.

3. The audio dosimeter of claim 1 wherein each succeeding comparator generates an output when the input noise level raises by 5dB(A).

* * * * *